(12) United States Patent
Smith

(10) Patent No.: US 8,919,626 B1
(45) Date of Patent: Dec. 30, 2014

(54) POWER CHAIR CARRIER SYSTEM

(76) Inventor: Ronald E. Smith, Glendale, AZ (US)

(*) Notice: Subject to any disclaimer, the term of this patent is extended or adjusted under 35 U.S.C. 154(b) by 198 days.

(21) Appl. No.: 13/463,505

(22) Filed: May 3, 2012

Related U.S. Application Data

(60) Provisional application No. 61/482,710, filed on May 5, 2011.

(51) Int. Cl.
*B60R 9/00* (2006.01)
*B60P 9/00* (2006.01)
*A61G 3/02* (2006.01)
*A61G 3/06* (2006.01)

(52) U.S. Cl.
CPC .............. *A61G 3/0209* (2013.01); *A61G 3/063* (2013.01)
USPC ............................ 224/519; 224/554; 414/462

(58) Field of Classification Search
USPC ........................... 224/519; 414/462; 248/503; 297/344.17; 280/250.1, 47.38
See application file for complete search history.

(56) References Cited

U.S. PATENT DOCUMENTS

| | | | |
|---|---|---|---|
| 4,297,069 A * | 10/1981 | Worthington | 414/462 |
| 4,477,117 A * | 10/1984 | Higgs | 297/45 |
| 4,592,562 A * | 6/1986 | Strautnieks et al. | 280/250.1 |
| 4,613,151 A * | 9/1986 | Kielczewski | 280/650 |
| 4,705,448 A * | 11/1987 | Mungons | 414/462 |
| 4,741,660 A * | 5/1988 | Kent | 414/462 |
| 5,096,008 A * | 3/1992 | Mankowski | 180/6.5 |
| 5,112,076 A * | 5/1992 | Wilson | 280/657 |
| 5,122,024 A * | 6/1992 | Stokes | 414/462 |
| 5,255,934 A * | 10/1993 | Wilson | 280/657 |
| 5,423,562 A * | 6/1995 | Pearce, Jr. | 280/250.1 |
| 5,540,539 A | 7/1996 | Wolfman et al. | |
| 5,592,997 A | 1/1997 | Ball | |
| 5,601,302 A * | 2/1997 | Beard et al. | 280/250.1 |
| 5,730,236 A * | 3/1998 | Miller et al. | 180/65.1 |
| 5,800,016 A * | 9/1998 | Allred | 297/344.17 |
| 6,068,280 A * | 5/2000 | Torres | 280/304.1 |
| 6,416,272 B1 | 7/2002 | Suehiro et al. | |
| 6,595,398 B2 * | 7/2003 | Himel, Jr. | 224/495 |
| 6,655,895 B1 * | 12/2003 | Dahl | 414/462 |
| 6,935,648 B2 * | 8/2005 | Beck | 280/250.1 |
| 7,066,549 B2 | 6/2006 | Dennon et al. | |
| 7,246,856 B2 * | 7/2007 | Kruse et al. | 297/330 |
| 7,455,362 B2 | 11/2008 | Hanson et al. | |
| 7,516,977 B2 * | 4/2009 | Wu et al. | 280/650 |
| 7,562,883 B2 | 7/2009 | Livengood et al. | |
| 7,578,012 B2 | 8/2009 | Palay et al. | |
| 7,708,093 B1 | 5/2010 | Baker | |
| 7,735,591 B2 | 6/2010 | Puskar-Pasewicz et al. | |
| D619,324 S * | 7/2010 | DiGiovanni et al. | D34/28 |
| 7,766,106 B2 | 8/2010 | Puskar-Pasewicz et al. | |
| 7,794,187 B2 | 9/2010 | Ditch | |
| 8,398,108 B2 * | 3/2013 | Andrews | 280/304.1 |
| 2006/0093462 A1 * | 5/2006 | Pradenas | 414/462 |

* cited by examiner

*Primary Examiner* — Justin Larson
*Assistant Examiner* — Lester L Vanterpool
(74) *Attorney, Agent, or Firm* — Cahill Glazer PLC

(57) ABSTRACT

A power chair carrier system includes a power chair having an elevating motor mounted thereon for raising or lowering the seat of the power chair and for raising or lowering the power chair drive assembly including wheels when the chair is mounted on a vehicle. A hitch assembly is removably connected to a vehicle and includes a docking structure for removably connecting to an upper portion of the power chair to permit the drive assembly and wheels of the power chair to be raised while the chair is in a docking position.

3 Claims, 6 Drawing Sheets

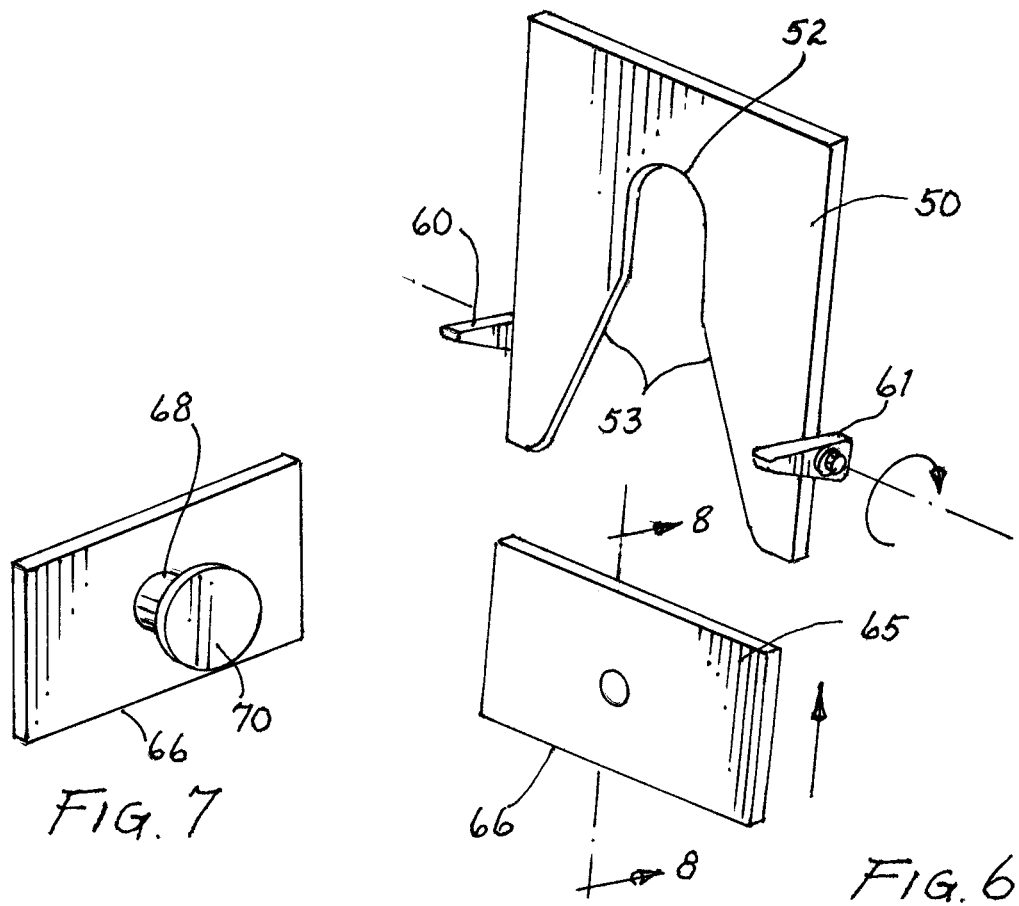
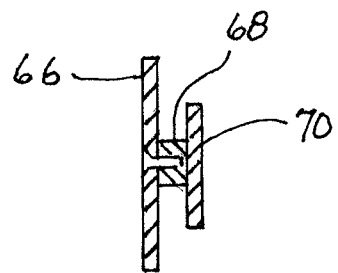
FIG. 7
FIG. 6
FIG. 8

POWER CHAIR CARRIER SYSTEM

RELATED APPLICATIONS

This application is related to and claims priority to a provisional application entitled "POWER CHAIR CARRIER SYSTEM" filed May 5, 2011, and assigned Ser. No. 61/482,710.

FIELD OF THE INVENTION

The present invention pertains to power chairs, and more particularly to apparatus for supporting and carrying a power chair on a motor vehicle.

BACKGROUND OF THE INVENTION

Powered wheel chairs or power chairs are presently available incorporating electric motors powered by onboard rechargeable batteries. The chairs typically are powered by an electric motor through an appropriate transmission to drive two driving wheels. Other supporting wheels are strategically positioned around the base of the chair to maintain the chair in an upright position. The controls for moving the chair forward, rearward, or for turning are typically mounted on the right or left arm of the chair to enable the occupant to direct the chair in an appropriate direction and at an appropriate speed. Usually the controls incorporate a toggle that is operated by the occupant's fingers.

There are numerous systems described in the prior art for transporting a power chair in or on a vehicle. For example, electrical or hydraulic ramps supporting a platform that extends outwardly from a van have been shown to be appropriate to provide support for a power chair that is driven onto the platform and subsequently raised and moved into the vehicle. Alternatively, similar electric/hydraulic systems have been shown wherein a platform or bracket system is attached to the rear of the vehicle to permit the power chair to be driven onto or coupled to the apparatus; the apparatus subsequently lifts the chair into a temporary storage position to permit the vehicle to be driven with the power chair mounted at the rear thereof.

The above systems for transporting a power chair have been found to be satisfactory; however, the systems all require a dedicated vehicle. That is, the vehicle upon which the power chair is to be mounted or carried must be substantially modified to permit the support and carrying of the power chair. The modification of such vehicles can be very expensive; further, if the vehicles are to be rented, an auto leasing or renting company must invest in numerous modified vehicles each of which requires extensive and expensive modification. A fleet of such vehicles may not be economically feasible and the availability of such vehicles to transport a power chair are therefore not always available. Individuals that own/operate a power chair must also have their vehicle modified to accommodate the carrying of the power chair. During times that the vehicle requires service or is disabled for some reason, the occupant/owner is effectively "grounded" until the vehicle is repaired.

SUMMARY OF THE INVENTION

The present invention departs from the prior art concept of vehicle modification to accommodate the carrying of a power chair. The principal concept involved incorporates a power chair having the on-board capability to raise itself to a mounted/carrying position so that the power required to position, mount and store the power chair on the vehicle is provided exclusively by the power chair. That is, the vehicle is completely passive and does not require any modification or auxiliary power equipment to permit the storage mounting and carrying of a power chair.

BRIEF DESCRIPTION OF THE DRAWINGS

The present invention may more readily be described by reference to the accompanying drawings in which:

FIG. 6 is a perspective view of an alternative docking structure useful in the system of the present invention.

FIG. 7 is a perspective view of the locking plate of FIG. 6 showing the locking pin.

FIG. 8 is a cross-sectional view along line 8-8 of FIG. 6.

DETAILED DESCRIPTION OF THE INVENTION

Figure 1:
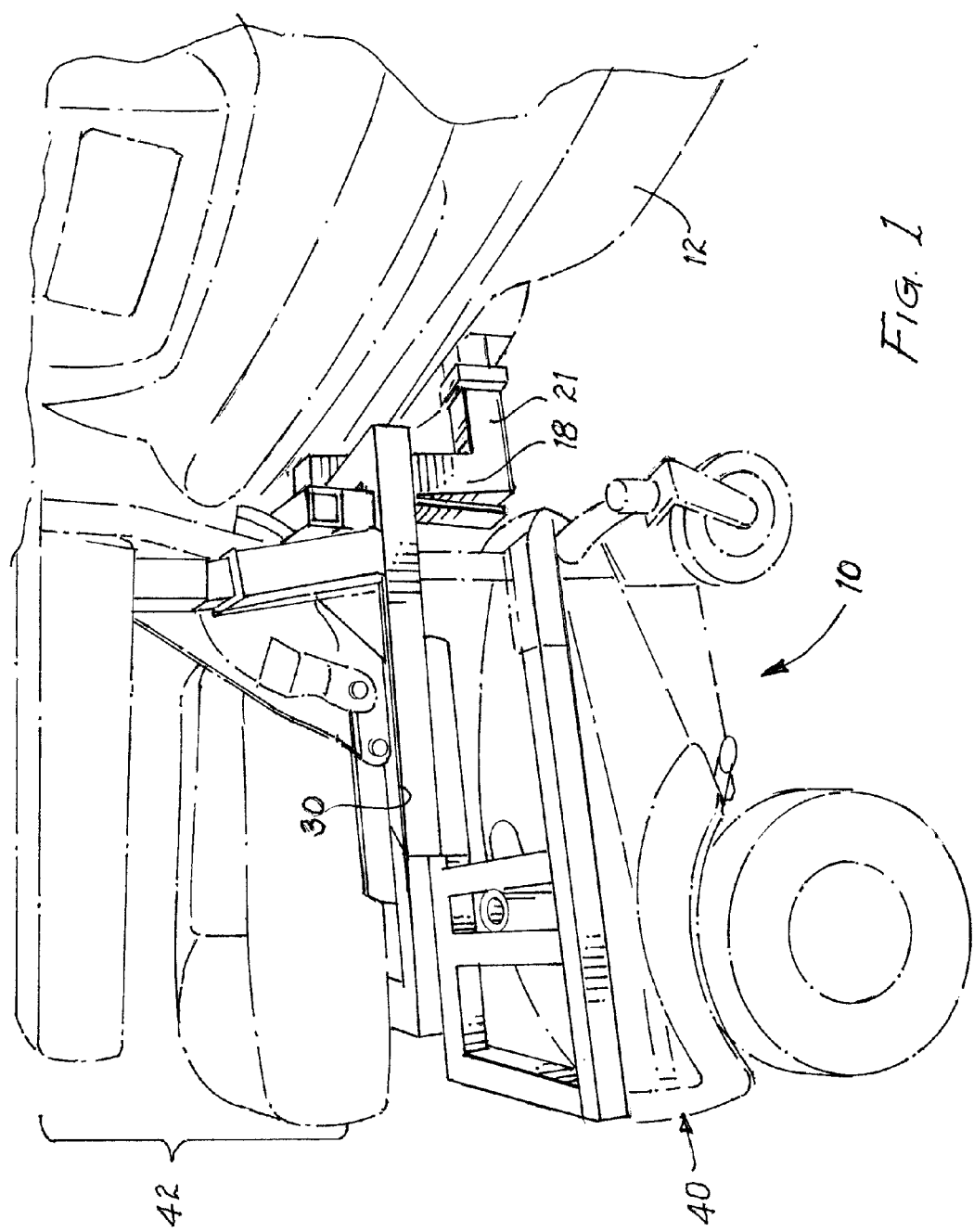
FIG. 1 is a perspective view of a power chair shown in a docked position releasably secured to a vehicle.

Referring to the attached Figures, a power chair 10 is shown that has been mounted to the rear of a vehicle 12 for transport thereon. The power chair when carried by the vehicle is supported on docking rails 15 that, in turn, are secured to the riser 18 of a docking hitch 20. The hitch socket or receiver 17 is a standard trailer hitch readily attachable to a motor vehicle. These hitches sometimes are classified in accordance with the weight that they are to support and that the vehicle is to tow; however, in view of the minimal weight of a power chair compared to a trailer, most classic hitches are appropriate. The hitch socket receiver is typically a 2"×2" square female receptacle for receiving the male portion of the hitch which is inserted therein and locked into position. This combination is a typical trailer hitch readily available for almost all existing motor vehicles. The male hitch is formed into a docking hitch 20 that incorporates a horizontal mounting bar 21 as well as the riser. The riser 18 connected to a horizontal mounting bar 21 which supports a pair of hitch arms or docking rails 15. These docking rails thus form part of the hitch and are readily removable with the hitch. It may be noted that the mounting and removal of the docking device is the same that is presently used for most trailer tow hitches on motor vehicles.

Figure 2:
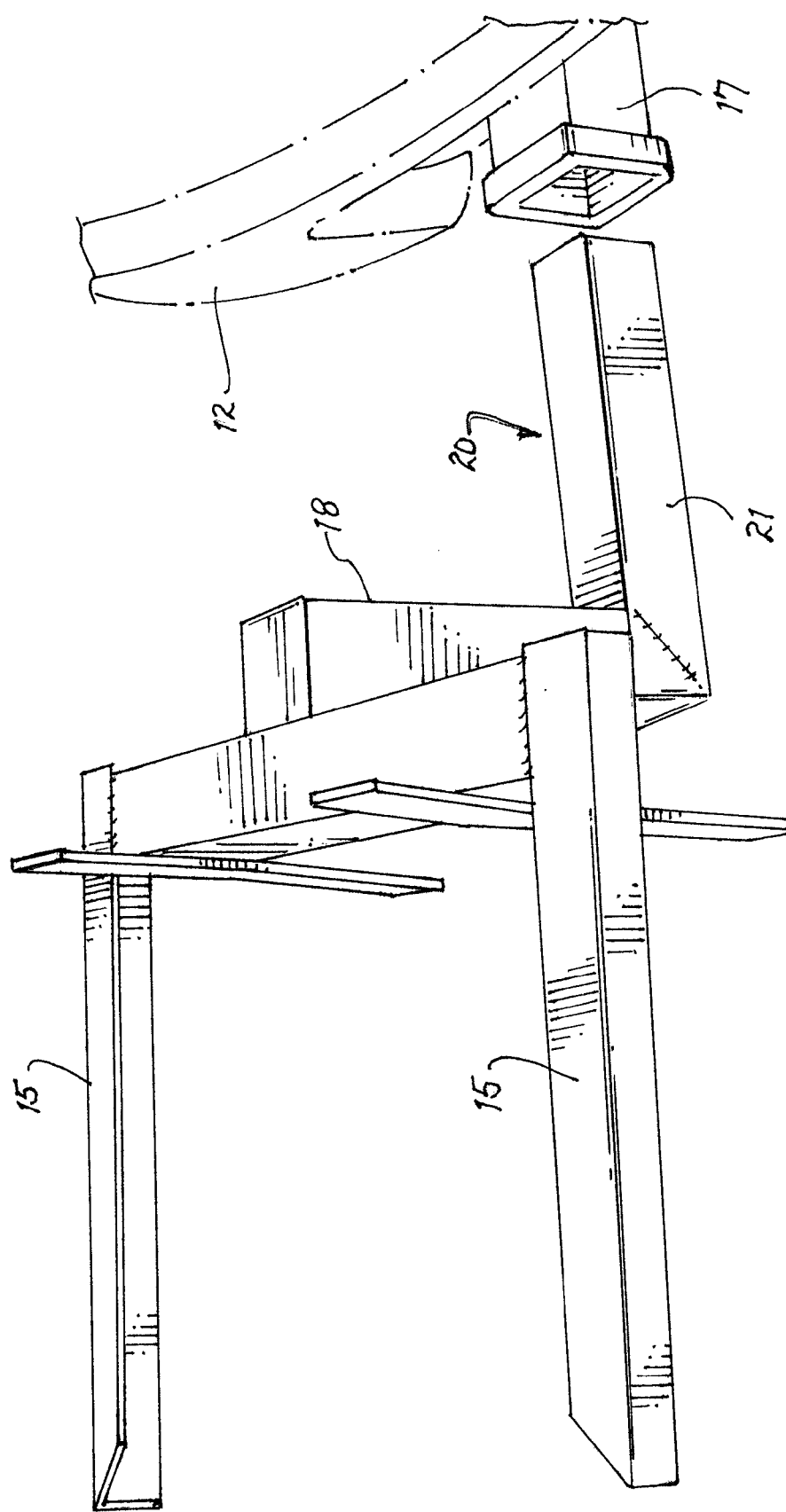
FIG. 2 is a perspective view showing the docking hitch and docking rails of the present invention.
Figure 3:
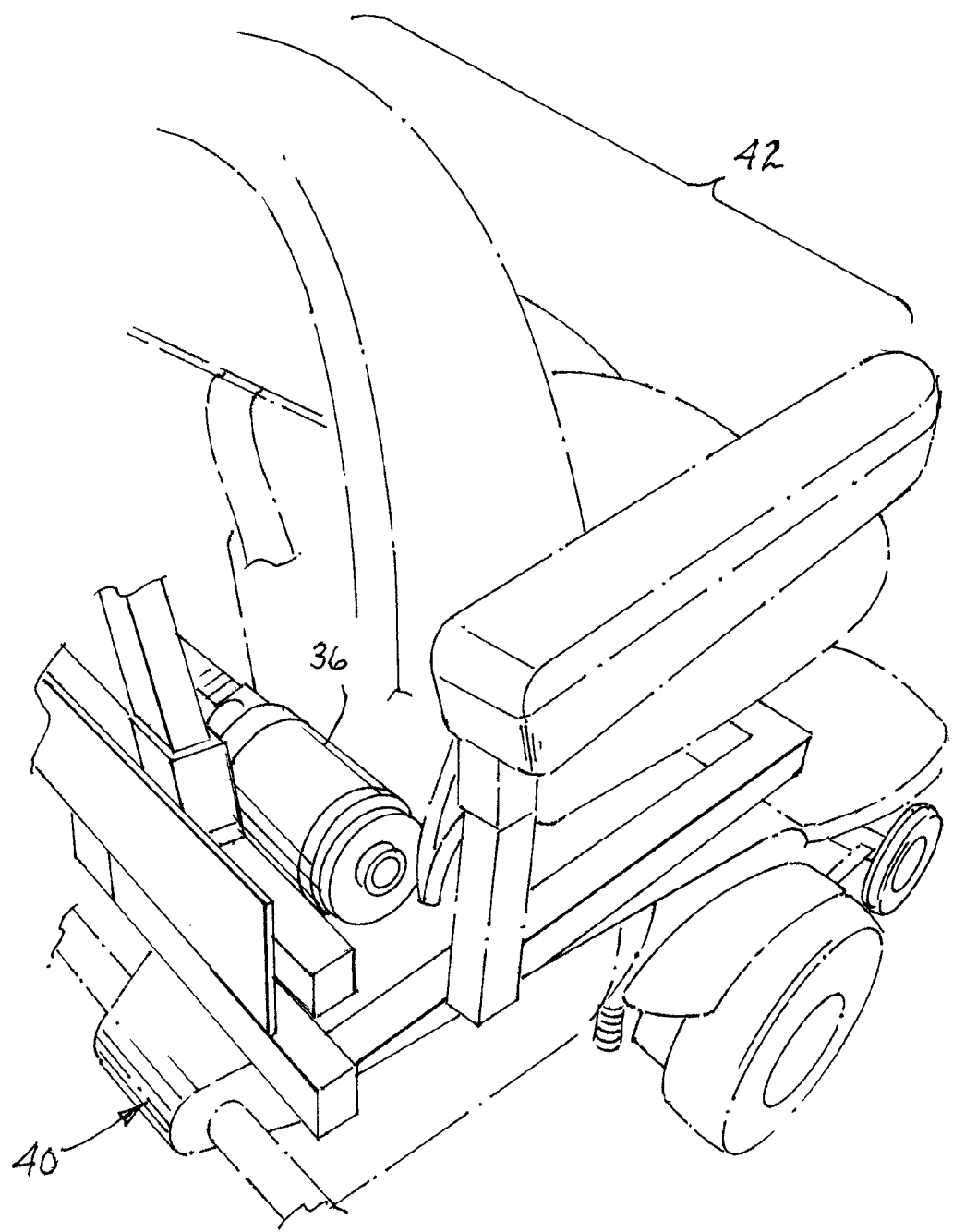
FIG. 3 is a perspective view of a power chair showing an elevating motor mounted on the upper portion of the docking chair.
Figure 4:
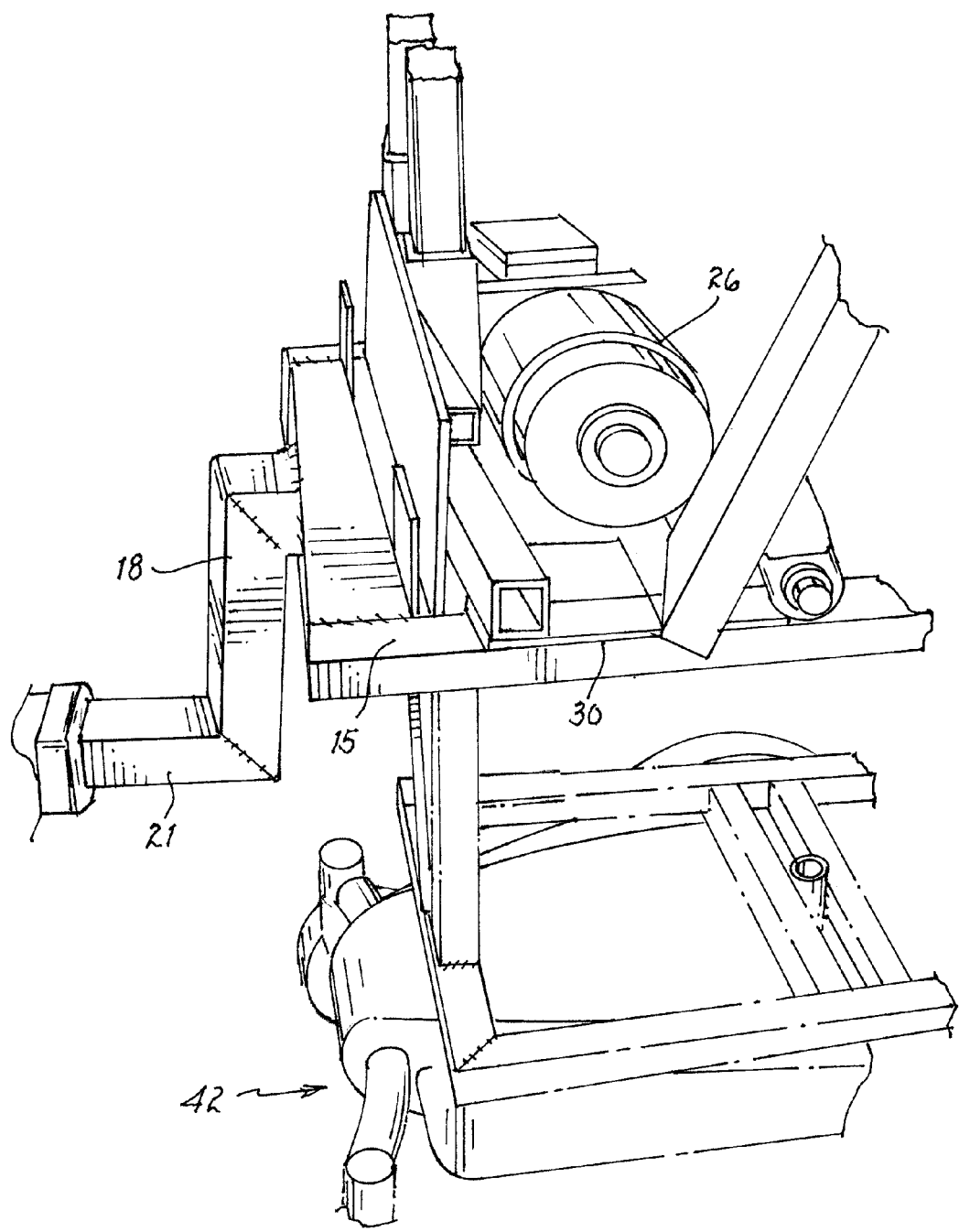
FIG. 4 is a partial perspective view showing the upper portion of a power chair and the elevating motor mounted thereon in contact with the docking hitch with the power chair drive assembly still in contact with the ground.
Figure 5A:
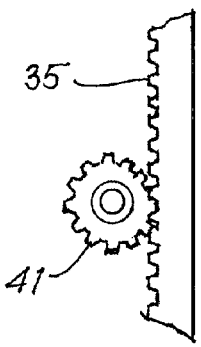
FIG. 5a is an enlarged view of the rack and pinion of FIG. 5.
Figure 5:
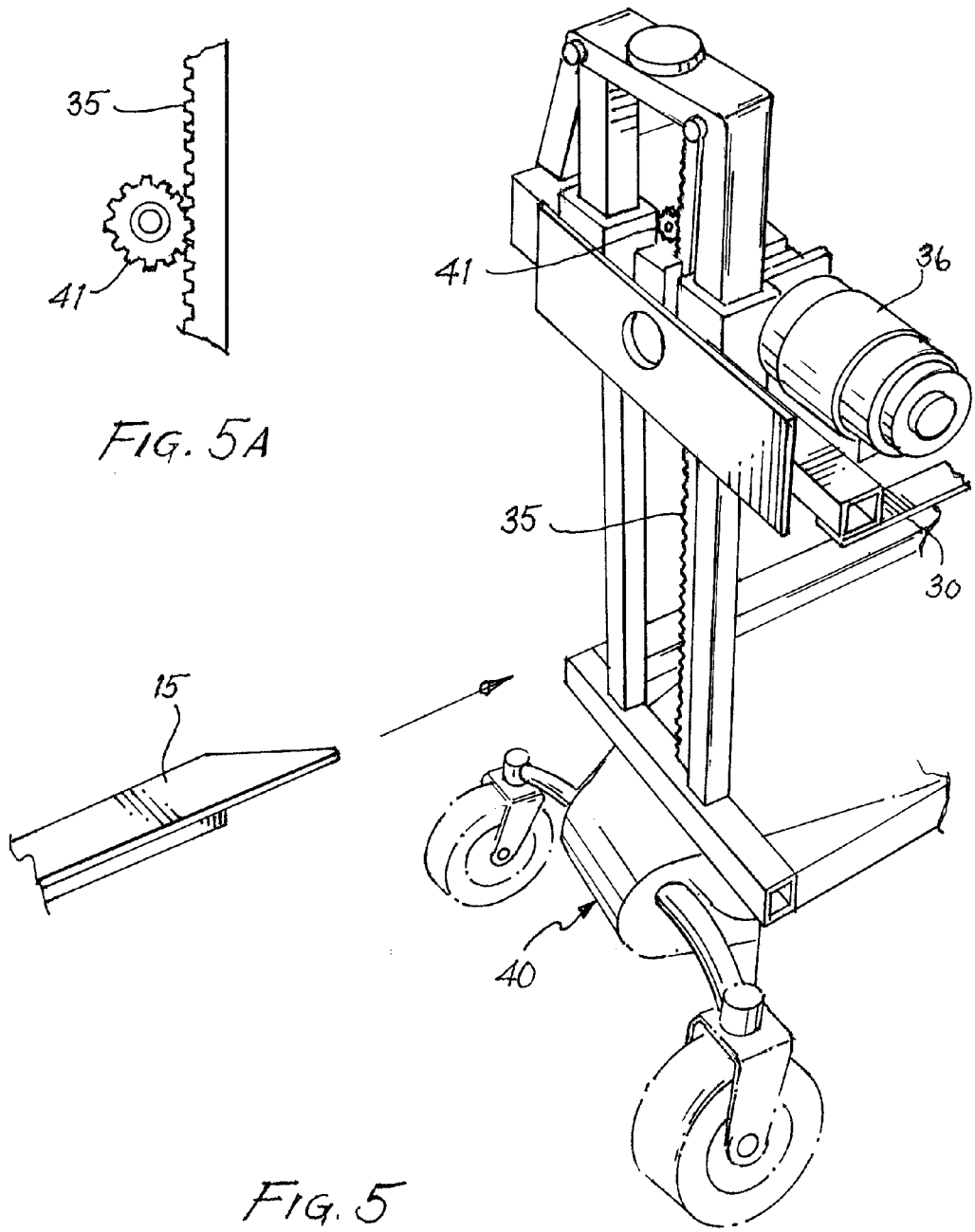
FIG. 5 is a perspective view of a portion of FIG. 4 showing the elevating motor and a rack and pinion system for raising the power chair drive assembly.

The power chair is provided with a docking structure for supporting the chair when mounted on a vehicle. In the embodiment shown in FIGS. 1-5, the structure comprises docking rail contact surfaces 30, or rest surfaces, that become aligned with and engage the docking rails 15 when the chair is in position. The power chair is also provided with an elevating mechanism which in the embodiment shown in the figures, comprises a rack and pinion arrangement wherein the rack 35 is a vertically extending support tube extending from the power chair drive assembly 40 that is engaged by a pinion 41 electrically driven by a suitable elevating motor 36 secured to the upper portion of the power chair. Thus, when the power chair is to be transported on the vehicle, the chair is driven to a docking position and backed into alignment with the docking rails. The elevating motor 36 is then energized and the pinion, engaging the vertically extending rack, raises the power chair drive assembly 40 including drive battery, electric motor, drive wheels, auxiliary wheels and support framework for those components to a stowage position wherein the chair's wheels are out of contact with the road/parking lot surface. In this position, the upper portion 42 of the chair including the seat, arms, backrest and elevating motor are supported in locked position on the docking rails. The wheels of the chair are raised sufficiently high for safe transport when secured to the docking rails and hitch.

Therefore, energization of the elevating motor 36 increases or decreases the distance between the power chair drive assembly 40 and the upper portion 42 of the chair including seat, arms and backrest of the power chair. If the power chair is in contact with the ground, energization of the elevating motor can raise or lower the seat relative to the ground; if the power chair is docked to a motor vehicle, energization of the elevating motor will raise the power chair drive assembly 40 and thus raise the drive wheels and auxiliary wheels of the chair out of contact with the ground.

When the vehicle transports the power chair to its destination, the chair may be disconnected from the vehicle by reversing the above procedure. That is, the power chair is energized to lower its wheels into contact with the parking lot/driveway/street surface by lowering the rack by energizing the electrically driven pinion in contact therewith. As the wheels of the chair contact the surface, the supporting docking rails of the docking device and the corresponding contact surfaces of the chair disengage and the chair may be driven off of the docking device.

The docking device may be readily removed from the vehicle by removing the typical tow hitch locking pin and sliding the horizontal portion of the docking device out of the hitch socket or receiver. The docking device may be stored as desired and the vehicle will be unencumbered with any additional power devices; the only apparatus to remain with the vehicle is the common, readily available trailer hitch receiver used by millions of motor vehicles. It may be noted that the power to raise the chair to its docking position is derived exclusively from the chair; further, the mechanism for accomplishing the elevated position is provided exclusively by the chair—the only accommodation required of the vehicle is the provision of a standard trailer hitch receiver.

FIGS. 6, 7 and 8 illustrate another embodiment of the present invention incorporating an alternate docking structure. Referring to FIG. 6 a mounting plate 50 is secured to the hitch on the vehicle in lieu of docking rails 15. The mounting plate 50 incorporates a docking receiver 52 and a guide slot 53. The mounting plate is provided with locking latches 60 and 61. A locking plate 65 is secured to the power chair and incorporates a locking pin 68 (FIG. 7). The diameter of the locking pin 68 is the same diameter as the locking receiver 52 on the mounting plate 50. The locking pin 68 includes an integrally formed cap 70 of a diameter significantly larger than the locking pin. When the locking pin is positioned in the docking receiver 52, the cap 70 and the locking plate 65 effectively lock the mounting plate 50 together to prevent side-to-side motion or motion perpendicular to the plates 50 and 65. In operation, the power chair is backed into position generally aligning the locking pin 68 with the guide slot 53. The power to the pinion 41 is applied and the power chair is raised until the locking pin engages the guide slots to be guided into the docking receiver. The locking latches 60 and 61 engage the lower edge 66 of the locking plate to secure the plate in position with respect to the mounting plate. The power to the pinion may then be reversed which results in the raising of the power chair wheels and drive mechanism thus lifting the chair out of contact with the pavement. The procedure may be reversed to disconnect the power chair from the vehicle. The locking latches may be manually or electrically disengaged to permit the separation of the locking plate from the mounting plate. The alternate embodiment is advantageous in that it does not require docking rails and is generally more compact.

It may be noted that the system may be arranged to permit the power chair to be mounted at a 90° angle, or transverse, with respect to the general longitudinal axis of the vehicle.

As a result of the above system, rental agencies may equip numerous selected vehicles with trailer hitch receivers inexpensively while nevertheless having those vehicles available for rental to power chair users. Those vehicles do not have to be expensively modified, and they can readily be rented to customers not having the requirement to transport a power chair.

The docking device may take other forms to engage and support the power chair while the onboard elevating power system of the chair raises the drive assembly and related equipment from contact with the ground to an elevated, stored and transportable position. In the above described alternative embodiment, the mounting plate secured to the hitch on the vehicle may be oriented with the guide slots extending upwardly so that the locking plate travels downwardly into the guide slots and into contact with the docking receiver 52. Other modifications may be made, for example, the docking rails may take a different form and may be arranged to be movable to a stowage position when not needed for supporting the power chair. Thus, the docking rails may be hinged or retractable to prevent them from protruding from the rear of the vehicle if the docking hitch remains attached to the vehicle without the power chair being mounted thereon. Other modifications may be made including the replacement of the rack and pinion with an onboard hydraulic system. For example, the rack 35 may be replaced by a double acting hydraulic piston/cylinder, and the pinion and elevating motor replaced by an electrically driven hydraulic pump. However, in all instances, power for mounting the power chair on the hitch is derived solely from the power chair while the hitch remains removable from a standard vehicle hitch receiver.

The present invention has been described in terms of selected specific embodiments of the apparatus and method incorporating details to facilitate the understanding of the principles of construction and operation of the invention. Such reference herein to a specific embodiment and details thereof is not intended to limit the scope of the claims appended hereto. It will be apparent to those skilled in the art that modifications may be made in the embodiments chosen for illustration without departing from the spirit and scope of the invention.

What is claimed:

1. In a power chair carrier system for receiving a power chair in a docking position on a motor vehicle wherein said power chair includes a power chair drive assembly having a drive battery, electric drive motor, drive wheels, auxiliary wheels and support framework and wherein said power chair includes an upper portion having a seat, arms and a backrest, the combination comprising:

(a) an elevating motor mounted on said upper portion connected to an elevating mechanism that, when energized while the power chair is in the docking position on said motor vehicle, raises or lowers the power chair drive assembly;
(b) a removable docking hitch, for connection to a hitch socket mounted on said vehicle, including a horizontal mounting bar and vertical riser;
(c) a docking structure including a mounting plate having a docking receiver and a guide slot on said docking hitch to contact the upper portion of said power chair; and
(d) a locking plate with a locking pin positioned on said upper portion for contacting said mounting plate to permit the locking pin to engage said guide slot and to permit the power chair to be driven into the docking position;

whereby energizing said elevating motor raises said power chair drive assembly to a storage position wherein the chair's wheels are out of contact with a road or parking lot surface.

2. The power chair carrier system of claim 1 wherein said elevating mechanism is a rack mounted on said power chair drive assembly and includes a mating pinion gear driven by said elevating motor mounted on said upper portion.

3. A power chair carrier system for releasably securing, when docked, a power chair having a power chair drive assembly including a drive battery, electric drive motor, drive wheels, auxiliary wheels, and support framework, and having an upper portion including a seat, arms and backrest, to a motor vehicle having a hitch socket, said system comprising:
(a) an elevating motor mounted on said upper portion connected to an elevating mechanism that, when energized, raises or lowers the upper portion relative to the power chair drive assembly;
(b) a removable docking hitch, for connection to said hitch socket, including a mounting bar and riser; and
(c) a docking structure comprising a mounting plate having a docking receiver and a guide slot mounted on said docking hitch and a locking plate with a locking pin mounted on said upper portion;

whereby energizing said elevating motor raises said power chair drive assembly and places said power chair in a docked position.

* * * * *